United States Patent
Telang

(10) Patent No.: US 6,756,106 B2
(45) Date of Patent: Jun. 29, 2004

(54) OIL RESISTANT ELASTIC RUBBER COMPOSITE

(75) Inventor: Ramesh Manjanath Telang, Pune (IN)

(73) Assignee: Garware Elastomerics Limited, Pune (IN)

( * ) Notice: Subject to any disclaimer, the term of this patent is extended or adjusted under 35 U.S.C. 154(b) by 70 days.

(21) Appl. No.: 10/270,965

(22) Filed: Oct. 15, 2002

(65) Prior Publication Data

US 2004/0071984 A1 Apr. 15, 2004

(51) Int. Cl.$^7$ ............................................... B32B 5/02
(52) U.S. Cl. ...................... 428/189; 523/436; 523/438; 523/457; 523/458; 525/93; 525/96; 525/99; 525/215
(58) Field of Search ................. 428/189; 523/436, 523/438, 457, 458; 525/93, 96, 99, 215

(56) References Cited

U.S. PATENT DOCUMENTS 5,118,546 A * 6/1992 Burlett et al. .............. 428/36.8

* cited by examiner

Primary Examiner—Margaret G. Moore
Assistant Examiner—D. Aylward
(74) Attorney, Agent, or Firm—Notaro & Michalos P.C.

(57) ABSTRACT

An oil resistant, elastomeric rubber composite, particularly suited for use as an elastic tape for garments requiring a high degree of oil resistance due to conditions of its use. The rubber composite is made from a unique blend of nitrile rubber, polychloroprene (neoprene), epoxidised natural rubber and natural rubber. The elastomeric composite has excellent compatibility between two rubbers of different polarity when properly compounded and processed. The composite formed as an elastic tape has a low modulus of elasticity, good needle tear strength when sewn inside a garment, and it provides a comfortable fit for long use in addition to having reduced oil swell and oil abosorption characteristics. Elastic tapes made from the elastomeric rubber composite are particularly suitable for swimwear, shower caps, head bands, face masks and other garments with direct skin contact.

16 Claims, No Drawings

OIL RESISTANT ELASTIC RUBBER COMPOSITE

FIELD AND BACKGROUND OF THE INVENTION

The present invention relates generally to the field of elastic used in garments and in particular to a new and useful elastomeric composite tape that can be used in garments, suitable for body oil and skin contact application.

The elastic tape most commonly used in garments today is primarily manufactured from natural rubber obtained from the tropical tree "Heavea Brasiliensis". Natural rubber, when suitably compounded, has a variety applications ranging from the tire industry to floor mats. Natural rubber is an elastomer that is well suited for use in the clothing industry because natural rubber elastic tape provides a garment with lower modulus of elasticity, high tear strength, and low permanent set. It is very strong but can be made soft.

But, unfortunately, natural rubber is nonpolar and swells in all nonpolar hydrocarbon solvents/oils, losing its strength and effectiveness. Thus, natural rubber tapes are not an ideal component for uses and end products that are likely to result in the rubber coming into contact with oils like body oil and sun tan oil.

Several patents describe blends of rubbers provided for a variety of different purposes.

U.S. Pat. No. 5,118,546, for example, teaches a sulfur-curable elastomeric composition for a tire tread having 60–95% wt. rubber selected from a group that includes natural rubber, nitrile rubber, and mixtures thereof. The remaining portion is derived from a blend of 25–75% wt. polychloroprene and 25 to 75% wt. epoxidized natural rubber.

The polychloroprene and epoxidized natural rubber are first masticated under conventional temperature and then later combined with a rubber stock comprising the elastomeric composition which may include natural and/or nitrile rubber. The rubber stock is also combined with various additives such as reinforcing agents, fillers, accelerators, vulcanizing agents, processing oils and antioxidahts.

U.S. Pat. No. 5,118,546 does not teach the application and advantages of an elastomer blend to clothing and elastic garments in particular. The patent teaches high proportions of natural rubber, nitrile rubber, polychloroprene, and epoxidized natural rubber.

A rubber composition containing a blend of natural rubber and epoxidized natural rubber for application to skin in the form of a tape is taught by U.S. Pat. No. 5,447,976. The blend is masticated in a Banbury mixer and combined with various ingredients such as antioxidants, accelerators, reinforcement fibers, fillers, pigments, dyes, and processing oils. Processing oils are required to make the composition. The rubber composition is disclosed for use as a tape in legbands, straps and swimwear garment edges, as well as in other clothing, but the patent discourages the use of polychloroprene in rubber compounds used in garments.

U.S. Pat. No. 5,736,593 discloses a ternary blend of polyisoprene (e.g., natural rubber), epoxidized natural rubber, and chlorosulfonated polyethylene. In particular, a composition is disclosed having about 76–94% wt. of poyisoprene, 3–12% wt. of epoxidized natural rubber, and 3–12% wt. chlorosulfonated polyethylene. The rubber composition is preferably used for tire treads.

U.S. Pat. No. 5,352,739 discloses a compatibilized rubber composition and a process for compatibilizing polar and nonpolar rubber blends, using compatibilzing agents such as ethylene vinyl acetate copolymer, ethylene methacrylate copolymer, and ethylene/propylene/diene terpolymer (EPDM) or ethylene/propylene (EP) rubber grafted with a polar monomer such as methyl methacrylate. In particular, the patent discloses a polar rubber such as nitrile or polychloroprene (also known as neoprene) blended with a nonpolar elastomer such as EPDM or EP in the presence of a copolymer compatibilizer.

U.S. Pat. No. 5,397,833 teaches a compatibilized rubber composition blending an ethylene/acrylate/acrylic acid terpolymer with two or more different polar and nonpolar rubbers selected from polychloroprene, natural rubber, and nitrile rubber among others. Preferred compositions are limited to only natural and nitrile rubbers, and the compositions disclosed do not contain epoxidized natural rubber.

The availability of other rubber blend compositions more suitable for use in body contacting applications is desirable.

SUMMARY OF THE INVENTION

It is, therefore, an object of the invention to provide an elastomeric composite for use in garments that has superior qualities of each individual component elastomer or rubber used alone, while retaining many of the preferred qualities of each component.

It is a further object of the invention that the elastomeric composition have high chlorine, salt water, and oil resistance to body oil and tanning oils, a low permanent set, a low modulus of elasticity, and high strength, while remaining cost efficient to produce.

Accordingly, an elastomeric composite is provided having a compatible blend of natural rubber (NR), polychloroprene (CR), nitrile rubber (NBR) and epoxidized natural rubber (ENR). The invention provides a compatible blend of the four different natural and synthetic rubber polymers to achieve oil resistance particularly suited for use with clothing that is designed for contact with skin. The elastomeric composite of the invention has about 20 to 65% by weight natural rubber (NR), about 5 to 30% by weight nitrile rubber (NBR), about 10 to 25% by weight epoxidized natural rubber (ENR), and about 1 to 5% by weight polycholoroprene (CR).

An elastic tape of the invention made from the elastomeric composite is suitable for use in garments because it does not swell in the presence of body oils and other oils that are applied to skin.

When formed as a tape, the elastomeric composite is extremely useful for leg bands, straps, and lining the contours of leg and head openings in swim suits and other garments. The elastic tape is also suitable for use in face masks, head bands, and shower caps.

The foregoing and other objects and advantages will become apparent to those skilled in the art upon reading the following detailed description of the preferred embodiments.

The various features of novelty which characterize the invention are pointed out with particularity in the claims annexed to and forming a part of this disclosure. For a better understanding of the invention, its operating advantages and specific objects attained by its uses, reference is made to the accompanying tables and descriptive matter in which a preferred embodiment of the invention is illustrated.

DESCRIPTION OF THE PREFERRED EMBODIMENTS

The present invention provides a compatible blend of nitrile rubber (NBR), polychloroprene rubber (CR), epoxidised natural rubber (ENR) and natural rubber (NR) in the form of a tape. In particular, the blend preferably comprises 35% acrylonitrile content nitrile rubber, WRT grade, mercaptan modified, polychloroprene rubber, 50% mole epoxidized natural rubber, such as ENR50 natural rubber produced in Guthrie, Malaysia and the purest variety of 3L or XL grade of technically specified natural rubber from Thailand or Vietnam. The equivalent grade of all these rubbers from other sources may be used as well.

The preferred ranges for the amount of each rubber and elastomer in the blend are shown in Table I below:

TABLE I

| Ingredient | Percent by weight (W/W) |
| --- | --- |
| Nitrile Rubber | 5–30 |
| Natural rubber | 20–65 |
| Epoxidized Natural rubber | 10–25 |
| Polychloroprene Rubber | 1–5 |

Other components may be added to these four base components of the elastomeric composite blend.

The several components of the elastomeric composite of the invention will now be discussed.

Polychloroprene (CR), or neoprene, is often used as a synthetic substitute for natural rubber because of its balanced combination of favorable properties. Polychloroprene is resistant to oil and degradation from expose to UV radiation, ozone, and weather. In particular, polychloroprene rubber has favorable oil resistance characteristics, including low swelling, dimensional stability and elasticity, because it is polar in nature. Since polychloroprene is polar, it is resistant to all nonpolar oils and solvents that are naturally produced by the body or are commonly applied to the body. It retains its properties over a wide range of temperatures as well. Polychloroprene is also notable for its physical strength and resistance to damage caused by flexing or twisting.

However, polychloroprene has a high specific gravity and therefore, lower yield. Polychloroprene is not an ideal substitute for natural rubber used alone because polychloroprene does not offer the favorable qualities at an efficient, competitive price. A more cost-effective solution is desirable. Also, polychloroprene is not as elastic as natural rubber and can cause permanent setting of a material upon stretching of the material. The elastomeric composite of the invention retains the beneficial properties of polychloroprene while avoiding the known drawbacks associated with its use.

The polychloroprene used in the composite of the invention is preferably modified by the addition of mercaptan.

Epoxidation of natural rubber using peroxycarboxylic acids ("peracids") has also been known for a long time as a method for producing a rubber that has favorable oil resistance properties. As the epoxidation level in natural rubber increases, there is an increase in the glass transition temperature, specific gravity, and oil swelling resistance.

But, epoxidized natural rubber (ENR) suffers from processing difficulties and unfavorable physical properties with increased level of epoxidation. Epoxidized natural rubber has low tear resistance and relatively higher permanent set compared to natural rubber.

Nitrile rubber (NBR) is oil resistant as well. NBR is a copolymer of acrylonitrile and butadiene. The acrylonitrile component is responsible for the oil resistant properties of NBR. The oil resistance of NBR increases as the proportion of acrylonitrile to butadiene increases. Preferably, the nitrile rubber contains between 25–45% wt. of acrylonitrile.

NBR shows unfavorable physical properties, and in particular, lower tear strength when not complemented with reinforcing fillers. The disadvantages of NBR make it unsuitable for clothing application even though the rubber is extremely popular in other applications where oil swelling must be limited.

Each of the rubbers that have been described above have one or more properties that are unfavorable to body contact or clothing applications. Unexpectedly, the blending of all of the rubbers in particular proportions has been found to produce an elastomeric composite that has high tear strength, low permanent set, oil resistance, and is cost-effective to manufacture. That is, the beneficial properties of each component are retained, while the combination cancels out the negative or unfavorable characteristics of the individual components used alone.

However, the four base components cannot simply be mixed together to provide these benefits. Other factors can affect proper blending of the different rubbers of the composition, such as polymer ratio, phase morphology, interfacial cross-linking, distribution of fillers, antioxidants, plasticizers, and curatives between the elastomers. The nature of these problems and methods for overcoming them to produce the elastomeric composite of the invention are discussed below.

The blending of natural rubber and nitrile rubber, for example, is intended to produce a vulcanizate with the best properties from each component. The high resistance to swelling by oils of NBR is combined with the favorable strength properties of natural rubber. In practice, the result is often disappointing in terms of properties and service life because of poor distribution of cross-links that arises through preferential solubility of curatives and vulcanization intermediates.

The extent of cross-linking across the interface between the rubbers is also important, since the difference in polarity of the rubbers causes high interfacial tension and limits cross-linking between the rubbers. A large difference in polarity and solubility of two rubbers increases interfacial tension due to minimal mixing of two elastomers at the interface. This leads to a poor opportunity for cross-linking between the two rubbers and can cause weakness at their interfaces, resulting in relatively large phase sizes.

The non-polar constituency of the composition based on the presence of natural rubber is almost equal to the polar constituency of the composition provided by the presence of a combination of relatively smaller amounts of epoxidized natural rubber, polychloroprene, and nitrile rubber. The large difference in polarity and miscibility of the rubbers increases interfacial tension and decreases cross-linking of the various rubbers.

Blends of highly incompatible elastomers may sometimes be improved by the addition of small amount of another polymer or chemical known as compatibilizer. Chlorinated polyethylene is a common compatibilizing agent, which appears to form a skin on non polar rubber that facilitates adhesion to polar rubbers. However, the greater the difference in solubility and/or viscosity of each component of the elastomer in the blend, the more difficult it is to produce a homogeneous mix.

In theory, a blend of plasticizers that are each compatible with different elastomers can be effective in improving blend homogeneity, provided they have a viscosity sufficiently high to maintain high shear on mixing. Plasticizers have the disadvantage of being prone to migrate and bloom. As a result, mixtures of aliphatic hydrocarbon resins are more commonly used. The homogenizing resins are themselves complex blends and contain parts that are compatible with polar and nonpolar components in a blend.

Additionally, ENR has an intermediate polarity, between those of NR and NBR, which assists in the distribution of curatives and interface cross-linking. Epoxidized natural rubber is derived from the modification of natural rubber and has some similarities to NR. The level of epoxidation increases the polarity of NR, which makes the modified NR more oil resistant, improves its compatibility with polar polymers.

The preferred range of all of the components of the blend composition are presented in table II below in parts per hundred with respect to the weight of the natural rubber:

TABLE II

| Ingredient | Preferred Range in parts per hundred (pph) rubber |
| --- | --- |
| Natural rubber (3L or XL) | 30–70 |
| Nitrile Rubber | 6–35 |
| Epoxidized Natural rubber | 12–30 |
| Polychloroprene | 2–5 |
| Compatibiliser | 1–5 |
| Homogeniser | 2–8 |
| Antioxidants | 0.75–2 |
| Activator | 2.5–7.5 |
| Fillers | 10–50 |
| Pigments | 0–20 |
| Accelerator | 1–2 |
| Vulcanising Agent | 1–3 |

A typical embodiment of the elastomeric composite is illustrated in Table III below:

TABLE III

| Ingredient | pph rubber |
| --- | --- |
| Natural rubber (3L or XL) | 65 |
| Nitrile Rubber | 10 |
| Epoxidized Natural rubber | 25 |
| Polychloroprene | 2.5 |
| Compatibiliser | 1.5 |
| Homogeniser | 6.0 |
| Antioxidants | 1.8 |
| Activator | 5.0 |
| Fillers | 25 |
| Pigments | 10 |
| Accelerator | 1.5 |
| Vulcanising Agent | 2.4 |
| Total | 155.7 |

As shown in Tables II and III above, the four rubber and elastomer components are blended along with a compatibilizer and homogeniser to enhance compatibility/miscibility of the blend. Chlorinated polyethylene may be used, for example, to facilitate adhesion of nonpolar rubbers to polar rubbers. Mixtures of aliphatic hydrocarbon resins may also be used in the composition for compatibilizing and homogenizing.

The composition also has other ingredients that are commonly employed in the compounding of rubbers and thermoplastic elastomers, including antioxidants, activators, fillers, pigments, and vulcanizing/accelerators combinations.

Preferred activators are zinc oxide and stearic acid. Accelerators preferably include bulky sulphenamide 2-(morpholino thio) benzothiazole or dicyclohexa benzothiazole sulphenamide. Titanium dioxide may be used as a colorant. No processing oils are added. Fillers, which improve resistance to oil swelling and tensile strength, may include semi-reinforcing silica for white products or carbon black for black products. Non-reinforcing fillers such as talc or calcium carbonate may also be used in the composition.

Conventional mixing equipment like a two roll mill, Banbury mixers and/or other extruders, calendaring units and a curing oven may be used to blend the components. All four rubber compounds of the composition are mixed with the other compounding ingredients in a Banbury mixer and curatives are added at a dumpmill.

To make an elastic tape, the mixed rubber elastomeric composite is calendered to form a rubber sheet of desired thickness. The resulting calendar roll is cured in an oven. The cured rubber sheet is subsequently slit into tapes having the desired dimensions. The elastic tapes have similar elasticity and oil resistance to a natural rubber/epoxidized natural rubber blend and are economically reasonable to produce.

Table IV illustrates the physical characteristics of a typical embodiment of the composite blend:

TABLE IV

| Property | Control Range | Typical Observed Value |
| --- | --- | --- |
| Modulus at 50% elongation, MPa | 0.50 ∓ 10% | 0.48 |
| Modulus at 100% elongation, MPa | 1.20 ∓ 10% | 1.12 |
| Modulus at 300% elongation, MPa | 2.50 ∓ 10% | 2.50 |
| Tensile strength, MPa | 15 ∓ 10% | 18 |
| Elongation at break (%) | 600 (min) | 750 |
| Needle Tear (N/mm/mm) | 12 (min) | 14 |
| Hardness Shore A | 45.0 ∓ 5 | 47 |
| Specific gravity | 1.15–1.25 | 1.16 |
| Permanent Set (%) | 7–9 | 7.5 |
| Hot air aging, % retention of modulus at 100% elongation at 150° C. for 2 hours | 50% (min) | 60% |
| Oil swell in baby or tanning oil | | |
| % volume swell | 14 (max) | 11 |
| % oil absorption | 10 (max) | 7.5 |

As can be seen from table IV, the elastomeric composite of invention provides as good or better elasticity than natural rubber alone, or neoprene, or ENR and NR blends. Oil resistance of a typical composition as measured by percent volume swell and rise in percent weight (oil absorption as determined per ASTM D 471) is many times lower than a natural rubber based product.

Tear properties, modulus of elasticity and permanent set are similar to a regular natural rubber based product with the exception that the composite blend of the present invention has resistance to swell in baby oil (mineral oil) or tanning oils and sunblocks, which are commonly used for skin protection. Other properties such as slight discoloration from prolonged exposure to sunlight/chlorinated water are common features. The typical embodiment illustrated in Table III can be used in the manufacture of garments, such as swimwear, having the advantage of body oil swell resistance.

While a specific embodiment of the invention has been shown and described in detail to illustrate the application of the principles of the invention, it will be understood that the invention may be embodied otherwise without departing from such principles.

What is claimed is:

1. An oil resistant, elastomeric rubber composite of polar and nonpolar elastomers and rubbers, comprising:

5–30% wt nitrile rubber;

20–65% wt natural rubber;

10–25% wt epoxidized natural rubber;

1–5% wt polychloroprene; and a compatibilizer for improving cross-linking between the nitrile rubber and natural rubber.

2. An elastomeric composite according to claim 1, wherein the nitrile rubber comprises 25–45% wt acrylonitrile.

3. An elastomeric composite according to claim 1, wherein the epoxidized natural rubber is formed by 50% epoxidation.

4. An elastomeric composite according to claim 1, further comprising fillers.

5. An elastomeric composite according to claim 4, wherein said fillers comprise 10–30% wt of the composite.

6. An elastomeric composite according to claim 4, wherein said fillers are selected from the group consisting of titanium dioxide, silica, clay, talc, calcium carbonate, and mixtures thereof.

7. An elastomeric composite according to claim 1, wherein said compatibilizer comprises 0.5–3% wt of the composite.

8. An elastomeric composite according to claim 1, further comprising 2–6% wt of a homogenizer.

9. An oil resistant, elastic tape for attaching to a garment, the elastic tape comprising:

an elastomeric composite comprising a mixture of 5–30% wt nitrile rubber, 20–65% wt natural rubber, 10–25% wt epoxidized natural rubber, 1–5% wt polychloroprene, and a compatibilizer for improving cross-linking between the nitrile rubber and natural rubber.

10. An elastic tape according to claim 9, wherein the nitrile rubber comprises 25–45% wt acrylonitrile.

11. An elastic tape according to claim 9, wherein the epoxidized natural rubber is formed by 50% epoxidation.

12. An elastic tape according to claim 9, further comprising fillers.

13. An elastic tape according to claim 12, wherein said fillers comprise 10–30% wt of the composite.

14. An elastic tape according to claim 12, wherein said fillers are selected from the group consisting of titanium dioxide, silica, clay, talc, calcium carbonate, and mixtures thereof.

15. An elastic tape according to claim 9, wherein siad compatibilizer comprises 0.5–3% wt of the composite.

16. An elastic tape according to claim 9, further comprising 2–6% wt of a homogenizer.

* * * * *